United States Patent
Garrett et al.

(10) Patent No.: US 9,712,348 B1
(45) Date of Patent: Jul. 18, 2017

(54) SYSTEM, DEVICE, AND METHOD FOR SHAPING TRANSMIT NOISE

(71) Applicant: AVAGO TECHNOLOGIES GENERAL IP (SINGAPORE) PTE. LTD., Singapore (SG)

(72) Inventors: David C. Garrett, Tustin, CA (US); Franciscus Van Der Goes, Zeist (NL); Hooman Darabi, Laguna Niguel, CA (US); Ramon A. Gomez, San Jose, CA (US); Murat Mese, Rancho Palos Verdes, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/043,067

(22) Filed: Feb. 12, 2016

Related U.S. Application Data

(60) Provisional application No. 62/279,416, filed on Jan. 15, 2016.

(51) Int. Cl.
*H04L 25/03* (2006.01)
*H04B 1/00* (2006.01)

(52) U.S. Cl.
CPC ..... *H04L 25/03834* (2013.01); *H04B 1/0028* (2013.01)

(58) Field of Classification Search
CPC .... H04B 1/7085; H04B 1/709; H04B 1/7183; H04B 17/21; H04B 1/408; H04B 1/7093; H04L 27/2657; H04L 27/2662; H04L 2027/0053; H04L 2027/0022; H04L 2027/0069; H04L 27/367; H04L 27/3405; H04L 25/0383; H04L 27/34054

USPC .............................. 375/250, 284–285, 296
See application file for complete search history.

(56) References Cited

U.S. PATENT DOCUMENTS

| | | | | |
|---|---|---|---|---|
| 4,648,117 A | * | 3/1987 | Kunugi | H03G 3/00 381/102 |
| 4,890,107 A | * | 12/1989 | Pearce | H03M 1/0626 341/118 |
| 5,446,917 A | * | 8/1995 | Krisciunas | H03H 17/0664 708/313 |
| 5,463,569 A | * | 10/1995 | Staver | H03H 17/0664 708/313 |
| 6,218,972 B1 | * | 4/2001 | Groshong | H04B 1/0003 341/143 |
| 6,370,499 B1 | * | 4/2002 | Fujii | H04B 1/665 704/200.1 |
| 6,693,953 B2 | * | 2/2004 | Cox | H04B 1/707 370/332 |
| 6,738,528 B1 | * | 5/2004 | Nio | H04N 19/80 358/426.14 |
| 7,295,623 B2 | * | 11/2007 | Raghavan | H04L 27/2601 375/261 |
| 7,428,488 B2 | * | 9/2008 | Saito | G10L 21/0364 704/200.1 |

(Continued)

*Primary Examiner* — Emmanuel Bayard
(74) *Attorney, Agent, or Firm* — Oblon, McClelland, Maier & Neustadt, L.L.P.

(57) ABSTRACT

A device includes circuitry configured to determine noise shaping parameters for one or more transmit signals on one or more transmit channels based on transmission protocol and spectral mask criteria. Frequency positions are identified for the one or more transmit channels based on the noise shaping parameters, and the noise shaping parameters are applied to the one or more transmit signals.

19 Claims, 10 Drawing Sheets

(56) References Cited

U.S. PATENT DOCUMENTS

| | | | | |
|---|---|---|---|---|
| 7,619,487 B2* | 11/2009 | Schmid | ............... | H04L 27/361 |
| | | | | 332/145 |
| 7,660,372 B2* | 2/2010 | Lee | .................. | H04L 7/042 |
| | | | | 375/240.21 |
| 8,165,314 B2* | 4/2012 | Sawashi | ............. | H04R 3/04 |
| | | | | 381/317 |
| 8,355,461 B2* | 1/2013 | Schmid | ............ | H04L 25/03828 |
| | | | | 327/291 |
| 8,391,410 B2* | 3/2013 | Wang | ................ | H03M 13/271 |
| | | | | 375/239 |
| 8,594,224 B2* | 11/2013 | Ibi | ..................... | H04L 1/0003 |
| | | | | 375/254 |
| 8,867,379 B2* | 10/2014 | Wijting | ............. | H04W 16/14 |
| | | | | 370/252 |
| 8,885,844 B2* | 11/2014 | Almquist | ........... | G10K 11/175 |
| | | | | 381/73.1 |
| 8,982,972 B2* | 3/2015 | Menkhoff | .......... | H04L 27/2601 |
| | | | | 375/260 |
| 8,983,833 B2* | 3/2015 | Joshi | ................. | G10L 21/0208 |
| | | | | 381/73.1 |
| 9,088,856 B2* | 7/2015 | Moeller | ................ | H04S 3/02 |
| 9,230,531 B2* | 1/2016 | Roggenkamp | ....... | G10K 11/002 |
| 9,237,399 B2* | 1/2016 | Lagodzinski | .......... | H04R 3/002 |
| 9,307,333 B2* | 4/2016 | Moeller | ............. | G10K 11/175 |
| 2004/0162720 A1* | 8/2004 | Jang | ................... | G10L 19/035 |
| | | | | 704/200.1 |
| 2007/0172080 A1* | 7/2007 | Janse | .................. | H04R 25/453 |
| | | | | 381/93 |
| 2011/0173004 A1* | 7/2011 | Bessette | .............. | G10L 19/005 |
| | | | | 704/500 |
| 2015/0295740 A1* | 10/2015 | Tanaka | ............... | H04L 27/2275 |
| | | | | 375/261 |
| 2016/0182026 A1* | 6/2016 | Meier | ................. | H03K 5/1252 |
| | | | | 455/95 |

* cited by examiner

SYSTEM, DEVICE, AND METHOD FOR SHAPING TRANSMIT NOISE

CROSS-REFERENCE TO RELATED PATENT APPLICATIONS

The present application claims the benefit of the earlier filing date of U.S. provisional application 62/279,416 having common inventorship with the present application and filed in the U.S. Patent and Trademark Office on Jan. 15, 2016, the entire contents of which being incorporated herein by reference.

BACKGROUND

Technical Field

The present disclosure relates to software defined radio (SDR), specifically a device, system, and method for shaping transmit noise with SDRs.

Description of the Related Art

Software defined radio (SDR) provides the opportunity to develop fully programmable wireless communication systems, effectively supplanting conventional radio technologies, which typically have the lowest communication layers implemented in primarily in fixed, custom hardware circuits. In addition, transmit noise that is produced when signals are generated at the transmitter can cause degradation of the transmitted signal, which reduces the performance of the radio. In some instances, the transmit noise results in reduced spectral efficiency and increased distance between frequency channels.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
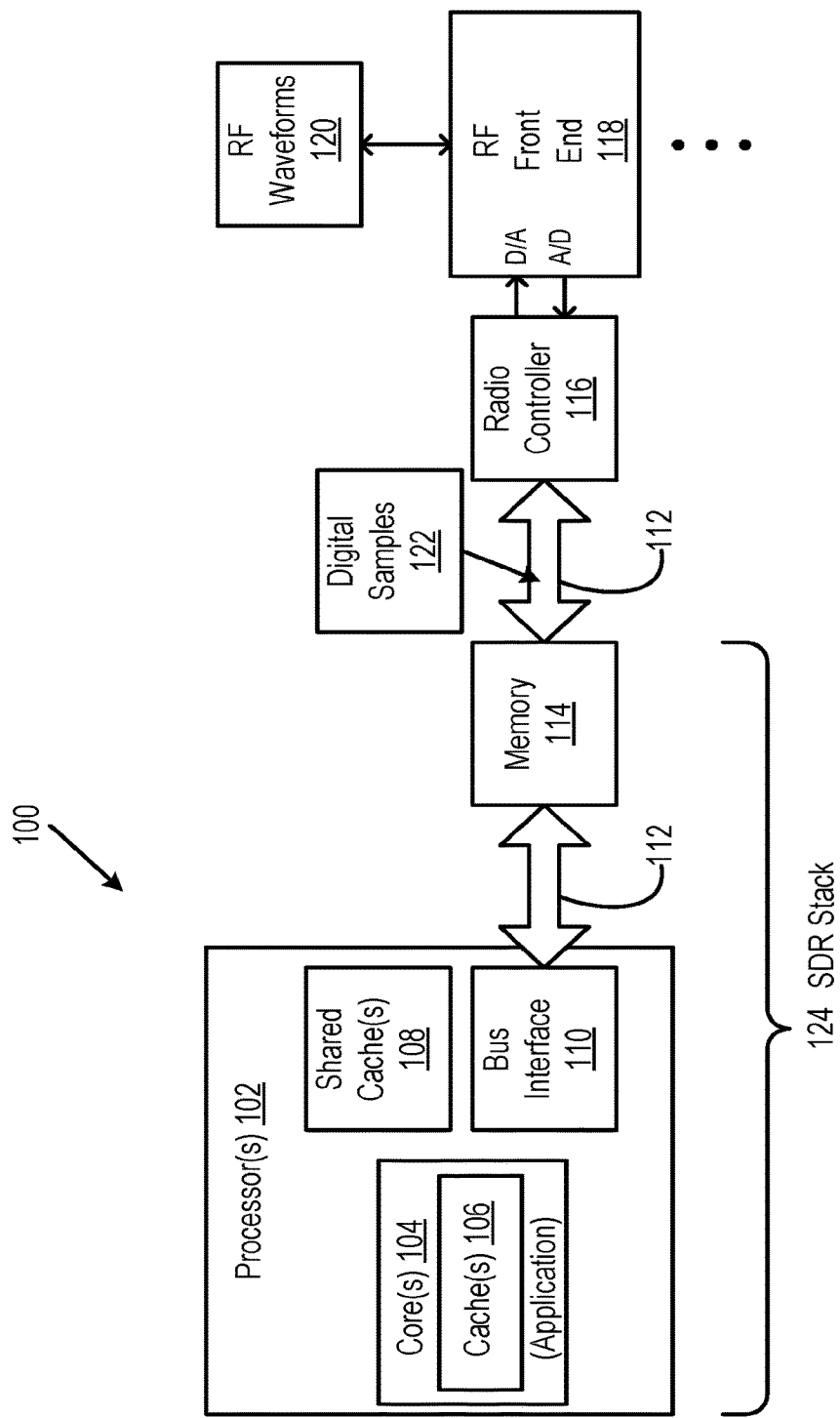
FIG. 1 is an exemplary illustration of a software defined radio (SDR) architecture, according to certain embodiments.

In the drawings, like reference numerals designate identical or corresponding parts throughout the several views. Further, as used herein, the words "a," "an" and the like generally carry a meaning of "one or more," unless stated otherwise.

In an exemplary implementation, a device includes circuitry configured to determine noise shaping parameters for one or more transmit signals on one or more transmit channels based on transmission protocol and spectral mask criteria, identify frequency positions for the one or more transmit channels based on the noise shaping parameters, and apply the noise shaping parameters to the one or more transmit signals.

In another exemplary implementation, a method includes determining noise shaping parameters for one or more transmit signals on one or more transmit channels based on transmission protocol and spectral mask criteria; identifying frequency positions for the one or more transmit channels based on the noise shaping parameters; and applying the noise shaping parameters to the one or more transmit signals.

In another exemplary implementation, a device includes circuitry configured to determine sampling rates for one or more transmit signals based on predetermined signal and noise specifications for the one or more transmit signals, modulate the one or more transmit signals simultaneously within a predefined frequency spectrum, and adaptively modify at least one of the sampling rates or frequency bands of the one or more transmit signals based on properties of a transmit channel or a receiver.

Aspects of the present disclosure are directed to implementing software defined radio (SDR) in transmitter applications by shaping transmit noise to minimize the impact of a channel on adjacent channels. By reducing the impact of transmit noise on the channel, less expensive transmitters can be used. In addition, transmission channels can be positioned closer together by deliberately shaping the transmit noise. The SDR may use spectral masks to shape the transmit noise. The transmit noise shaping can also be used in real simultaneous dual band (RSDB) and carrier aggregation applications.

Implementations disclosed herein present a fully programmable software defined radio (SDR) platform and system able to be implemented on general-purpose computing devices, including personal computer (PC) architectures. Implementations of the SDR herein combine the performance and fidelity of general-purpose processor (GPP) SDR platforms. In addition, implementations of the SDR herein may use both hardware and software components and techniques to perform the processes described herein.

FIG. 1 illustrates an exemplary architecture of an SDR platform and system 100 according to some implementations herein. The SDR platform and system 100 includes one or more processors 102 that may be multi-core processors according to some implementations. Each core 104 includes one or more corresponding onboard local caches 106 that are used by the corresponding 104 during processing. Additionally, the processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In addition, the processor 102 may be reprogrammable hardware such as Field Programmable Gate Arrays (FPGA), or even dedicated hardware engines. In one example illustrated, one or more cores can be allocated for performing processing for the SDR, while other remaining cores can perform processing for other applications, the operating system, or the like. Further, in some implementations, two or more processors 102 can be provided, and cores 104 across the two or more processors 102 can be used for SDR processing. Throughout the disclosure, the processors 102 can interchangeably be referred to as processing circuitry or circuitry.

The processor 102 is in communication via bus interface 110 with a high-throughput, low-latency bus 112, and thereby to a system memory 114. The bus 112 may be a PCIe bus or other suitable bus having a high data throughput with low latency. Further, the bus 112 is also in communication with a radio controller 116. As is discussed further below, the radio controller 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, the RF front end 118 may include analog-to-digital (A/D) and digital-to-analog (D/A) converters, and necessary circuitry for radio frequency transmission, as is discussed further below.

During receiving, the RF front end 118 acquires an analog RF waveform 120 from the antenna, possibly down-converts the waveform to a lower frequency, and then digitizes the analog waveform into discrete digital samples 122 before transferring the digital samples 122 to the radio controller 116. During transmitting, the RF front end 118 accepts a stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the processor 102, the design of RF front end 118 can be rather generic. For example, the RF front end 118 can be implemented in a self-contained module with a standard interface to the radio controller 116. Multiple wireless technologies defined on the same frequency band can use the same RF front end hardware 118. Furthermore, various different RF front ends 118 designed for different frequency bands can be coupled to radio controller 116 for enabling radio communication on various different frequency bands. Therefore, implementations herein are not limited to any particular frequency or wireless technology.

According to some implementations herein, the radio controller 116 is a PC interface board optimized for establishing a high-throughput, low-latency path for transferring high-fidelity digital signals between the RF front end 118 and memory 114. The interfaces and connections between the radio front end 118 and multi-core processor 102 can enable sufficiently high throughput to transfer high-fidelity digital waveforms. Accordingly, to achieve a predetermined system throughput, some implementations of the radio controller 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices. The radio controller 116 can also be a dedicated hardware bus connection, and may even be co-located with the processor 102 and the RF front end 118.

One role of the radio controller 116 is to act as a bridge between the synchronous data transmission at the RF front end 118 and the asynchronous processing on the processor 102. The radio controller 116 implements various buffers and queues, together with a large onboard memory, to convert between synchronous and asynchronous streams and to smooth out bursty transfers between the radio controller 116 and the system memory 114. The large onboard memory further allows caching of pre-computed waveforms for quick transmission of the waveforms, such as when acknowledging reception of a transmission, thereby adding additional flexibility for software radio processing.

In addition, the radio controller 116 provides a low-latency control path for software to control the RF front end hardware 118 and to ensure that the RF front end 118 is properly synchronized with the processor 102. For example, wireless protocols have multiple real-time deadlines. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The radio controller 116 of implementations herein also provides for such low latency control.

Figure 2:
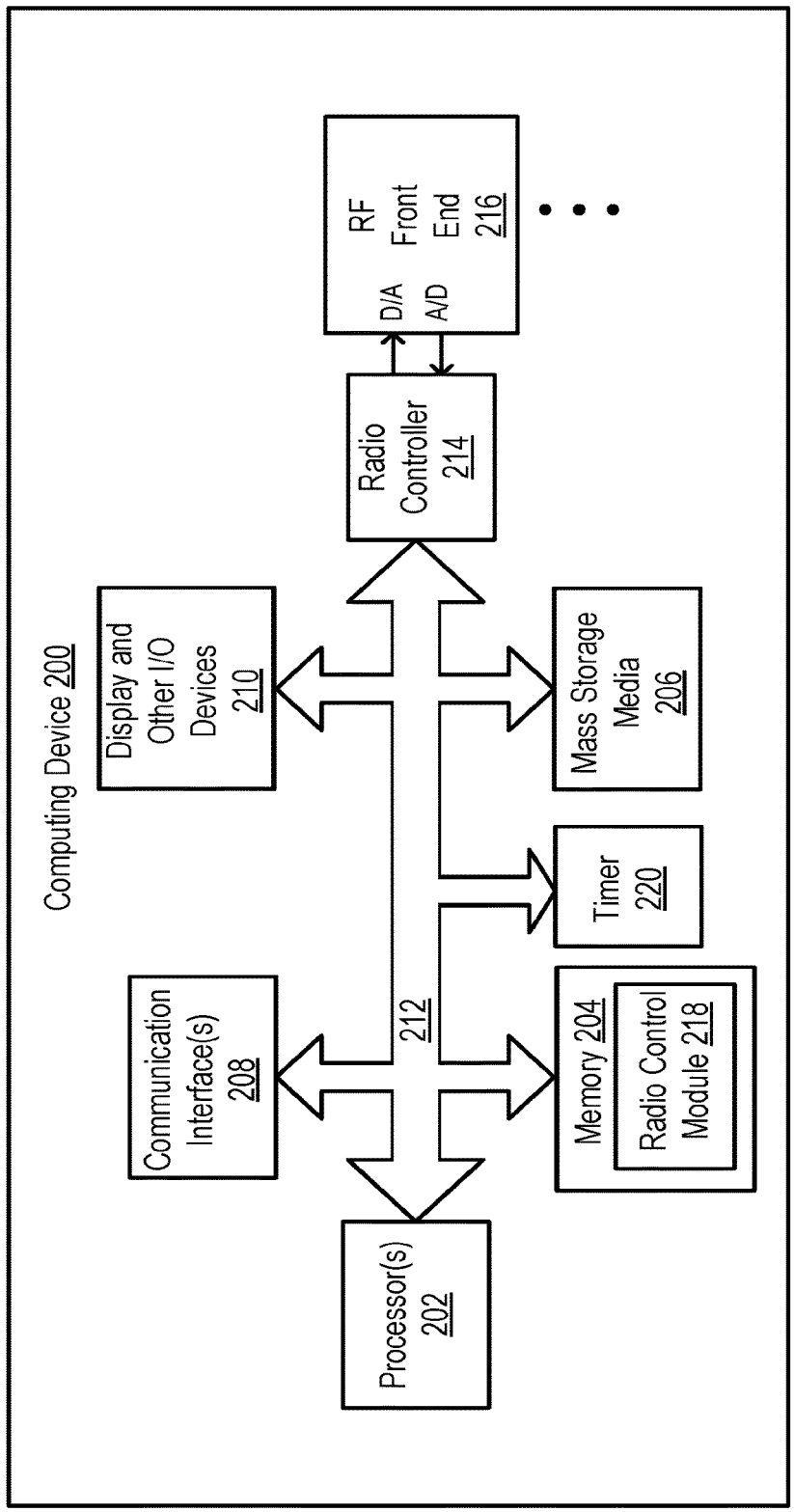
FIG. 2 is an exemplary diagram of a hardware and logic configuration of a computing device, according to certain embodiments.

FIG. 2 illustrates an exemplary depiction of a computing device 200 that can be used to implement the SDR implementations described herein, such as the SDR platform and system 100 described above with reference to FIG. 1. In the implementations described further herein, the computing device 200 may be any hardware device that can perform wireless communications, such as a wireless access point or mobile device that can implement one or more wireless communication protocols, such as a base station, switch, router, user equipment (UE), and the like. Throughout the disclosure, the terms computing device and SDR can be used interchangeably.

The computing device 200 includes one or more processors 202, a memory 204, one or more mass storage devices or media 206, communication interfaces 208, and a display and other input/output (I/O) devices 210 in communication via a system bus 212. In addition, the computing device 200 can also include one or more timer blocks 220 in order to provide a notion of time to the various components of the computing device 200. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio controller 214 and RF front end 216 for implementing the SDR herein. For example, system bus 212 may be a PCIe compatible bus, or other suitable high throughput, low latency bus. The radio controller 214 and the RF front end 216 may correspond to the radio controller 116 and the RF front end 118 described previously with reference to FIG. 2, and as also described below, such as with reference to FIG. 3. Furthermore, a radio control module 218 can include software instructions stored in memory 204 or other computer-readable storage media for controlling operations on radio controller 214, as is described additionally below. The computing device 200 described herein is only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software-defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Figure 3:
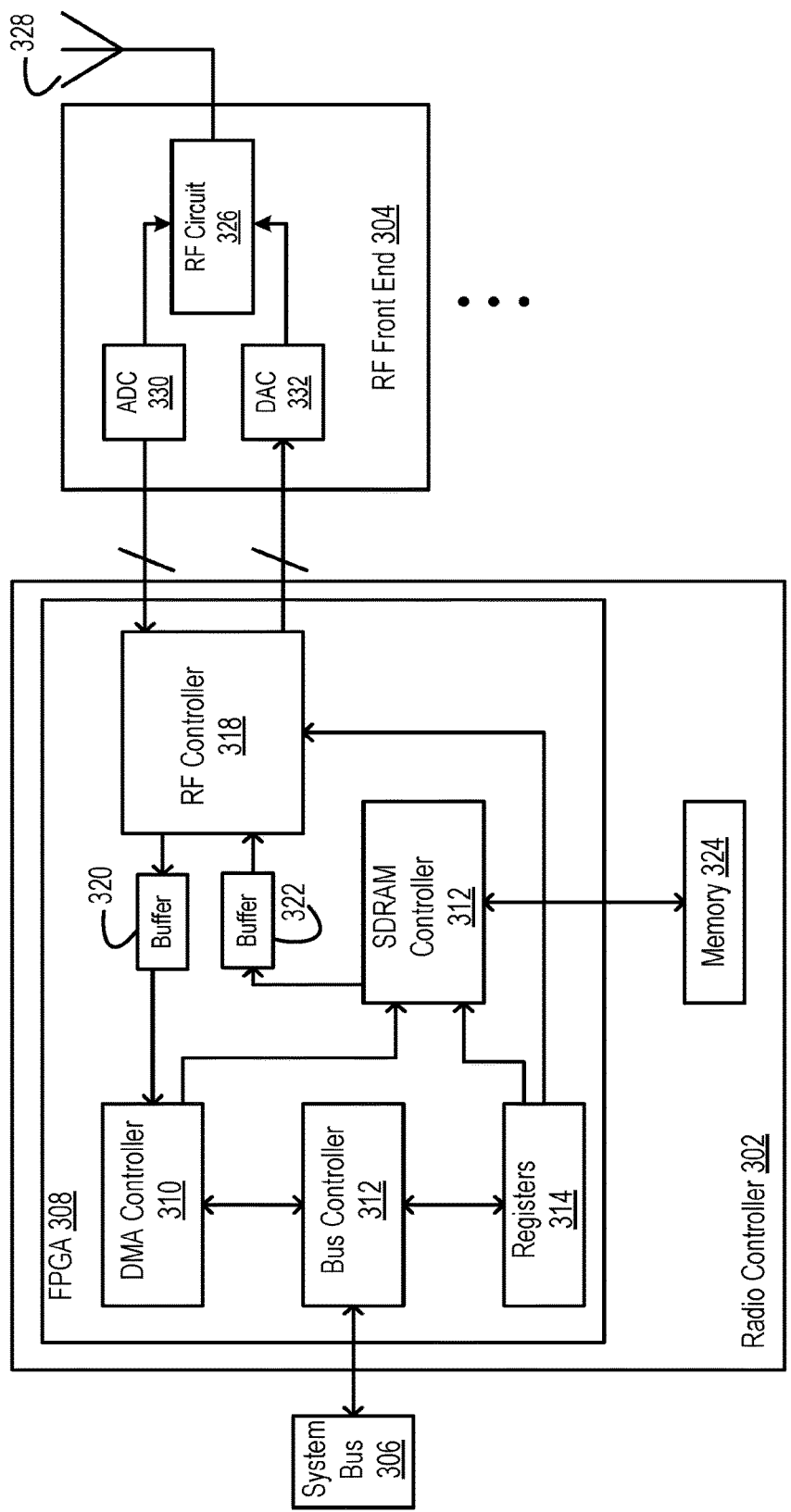
FIG. 3 is an exemplary diagram of a radio controller and a RF front end, according to certain embodiments.

FIG. 3 illustrates an exemplary implementation of a radio controller 302 and RF front end 304 that may correspond to the radio controller 116, 214 and RF front end 118, 216 described previously. In the example illustrated, the radio controller 302 includes functionality for controlling the transfer of data between the RF front end 304 and a system bus 306, such as buses 112, 212 discussed previously. In the illustrated implementation, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. The radio controller 302 includes a direct memory access (DMA) controller 310, a bus controller 312, registers 314, an SDRAM controller 316, and an RF controller 318. The radio controller 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like.

The radio controller 302 can connect to various different RF front ends 304. In some implementations, the RF front end 304 includes an RF circuit 326 configured as an RF transceiver for receiving radio waveforms from an antenna 328 and for transmitting radio waveforms via antenna 328. The RF front end 304 further may include an analog-to-digital converter (ADC) 330 and a digital-to-analog converter (DAC) 332. As discussed previously, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into the radio controller 302. Alternatively, in other implementations, analog-to-digital converter 330 and digital-to-analog converter 332 may be incorporated into the radio controller 302, and RF front end 304 may merely have an RF circuit 326 and antenna 328. Other variations may also be apparent in view of the disclosure herein.

In the implementation illustrated in FIG. 3, the DMA controller 310 and bus controller 312 interface with the memory and processor on the computing device (not shown in FIG. 3) and transfer digital samples between the radio controller 302 and the system memory on the computing device, such as memory 114, 204 discussed above. The radio controller software control module 218 discussed above with reference to FIG. 2 sends commands and reads radio controller states through radio controller registers 314. The radio controller 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large radio controller memory 324 enables implementations of the radio controller manager module 218 (e.g., FIG. 2) to first write the generated samples onto the radio controller memory 324, and then trigger transmission with another command to the radio controller 302. This functionality provides flexibility to the implementations of the SDR manager module 218 for pre-calculating and storing of digital samples corresponding to several waveforms before actually transmitting the waveforms, while allowing precise control of the timing of the waveform transmission.

In addition, the radio controller 302 provides the flexibility to be able to shape transmit noise for multiple transmit signals being modulated and transmitted simultaneously by at least one RF front end 304 transmitter. For example, processing circuitry of the radio controller 302 can simultaneously modulate multiple transmit signals with multiple transmission protocols within a given spectrum with various noise shaping parameters that can reduce interference between transmit channels, reduce interference between devices, and reduce an amount of hardware associated with the RF front end 304. In some implementations, the transmitter of the SDR 200 can use direct sampling and/or heterodyne methods to modulate and transmit signals through a transmission channel. Details regarding implementations of noise shaping with SDR are discussed further herein.

In SDR implementations, functionality of some radio components is achieved through execution of one or more software processes by the processing circuitry of the processor 202 rather than through dedicated hardware components, which can be referred to as software defined components. For example, the filter components, and digital signal processor may be software defined components of the SDR. In addition, some of the components of the RF front end 216 can also be executed as software defined components and/or are configured by the software defined components. For example, the configuration of the ADCs of the receiver can be modified by control signals issued by the processing circuitry.

Figure 4:
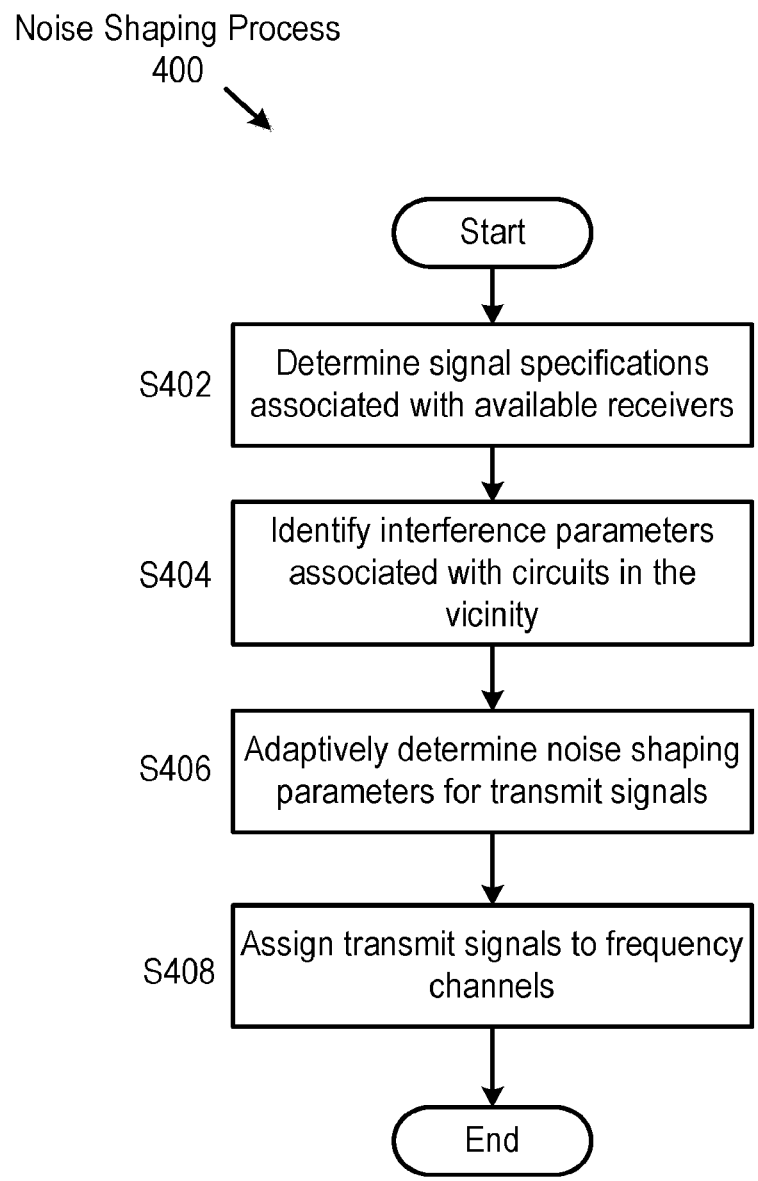
FIG. 4 is an exemplary flowchart of a noise shaping process, according to certain embodiments.

FIG. 4 is an exemplary flowchart of a noise shaping process 400, according to certain embodiments. When signals are produced and transmitted by the RF front end 216, transmit noise can be introduced into the signal through various sources, such as quantization errors that are introduced at the DAC. In some implementations, SDR can be used to determine and/or modify sampling rates, configurations of the RF front end 216, frequency locations of transmit channels and other parameters that affect noise shaping based on characteristics of types of signals being transmitted by the SDR 200, types of receivers within a predetermined distance of the SDR 200, and how the transmit signals impact other circuits within a predetermined distance of the SDR 200. By adaptively updating noise shaping parameters, the SDR 200 is able to improve efficiency of use of a transmission frequency spectrum so that a signal-to-noise ratio (SNR) of the transmit signals is increased and bit error rate (BER) is improved. Improving the efficiency of use of the transmission frequency spectrum also increases an amount of additional spectrum bandwidth available for modulating additional transmission signals. In addition, improving transmit signal quality through noise shaping allows power consumption and cost of the RF front end 216 to be reduced. In addition, the noise shaping process 400 can be applied to SDRs that are installed in a wireless access point or a user equipment, such as a mobile device configured to operate with one or more wireless network protocols.

At step S402, signal specifications associated with one or more receivers within a predetermined communications distance of the transmitter are determined. In some implementations, the SDR 200 can determine one or transmission signal types based on characteristics of the receivers within a predetermined communications distance of the transmitter. The predetermined communications distance may be based on an average range for transmission signals based on the transmission protocols and operating frequencies of the devices in communication with one another. The SDR 200 can determine the transmission signal types based on transmission protocols of the receivers within the predetermined communications distance. For example, the SDR 200 can include an offline transceiver that scans a local spectrum environment for receiving devices with which to communicate, such as base stations, user equipments (UEs), switching devices, routers, and the like. In certain embodiments, the SDR 200 is connected to the receiving devices via a backhaul communications network and detects the receiving devices through the network. When a receiving device is detected, the processing circuitry can determine characteristics of the receiving device, such as a transmission protocol, frequency band, performance parameters associated with the receiving device (e.g., SNR, BER, etc.) associated with the receiving device. The SDR 200 can then use the characteristics of the receiving device to determine a sampling rate, spectral mask, frequency band positions, and other noise shaping parameters.

At step S404, interference parameters associated with one or more circuits within a predetermined distance of the transmitter are identified. In some implementations, signals generated by the transmitter of the SDR 200 can produce harmonics and/or noise that affect performance of circuits within a vicinity of the transmitter. The circuits may include additional RF front ends 304 associated with the SDR 200, other circuits located within the computing device 200, or communications devices connected to the SDR 200 via the backhaul network. The SDR 200 can receive feedback from the other circuits via the bus 212 or the backhaul network that includes interference data, such as SNR, frequency and signal strength of harmonics from the transmitter that affect the other circuits, and the like. In addition, the additional devices can transmit interference signals to the SDR 200 via a wireless communication channel that include the interference parameters indicating how much impact the interference the transmit signals from the SDR 200 have on the additional devices.

At step S406, the processing circuitry adaptively determines noise shaping parameters for transmit signals based on the characteristics of the receivers determined at step S402 and interference parameters determined at step S404 and applies the noise shaping parameters to the transmit signals. The noise shaping parameters can include at least one of a sampling rate, noise shaping scheme, spectral mask data, error vector magnitude data, and the like. In some implementations where a direct sampling transmitter is used, the sampling rate determined by the processing circuitry of the SDR 200 corresponds to a multiple of the Nyquist rate.

Once an oversampled signal is obtained, the SDR 200 modifies the oversampled signal to achieve noise shaping of the signal. In one implementation, the oversampled signal can be modified via a noise shaping scheme that includes single-rate or multi-rate filter parameters. For a heterodyne transmitter, the processing circuitry can determine a noise-shaped baseband or intermediate frequency (IF) source with an upconversion mixer. In addition, the transmitter can apply an analog finite impulse response (FIR) filter by combining multiple delayed versions of an original transmit signal with analog weighting to implement the FIR filter with desired transfer function zeroes to noise shape the transmit signal.

According to certain embodiments, the processing circuitry of the SDR 200 applies a spectral mask filter to the transmit signals to ensure that the transmit signals meet spectral mask criteria for one or more transmission protocols. The processing circuitry can also modify the transmit signals to ensure that error vector magnitude (EVM) specifications are met. For a multi-band transmitter, the processing circuitry of the SDR 200 can merge the spectral mask for multiple transmission protocols or frequency bands into a joint spectral mask filter and apply the joint spectral filter mask so that the transmit signals meet spectral mask specifications for multiple frequency bands or transmission protocols. Generating the joint spectral masks for multi-band transmissions reduces a number of transmission sources and can also reduce complexity and cost of filter circuitry.

In addition, the processing circuitry may selectively improve or apply the spectral masks for one or more frequency bands associated with one or more receivers to reduce an overall filter complexity and improve signal capacity of the transmitter. The processing circuitry of the SDR 200 can improve spectral mask filters for frequency bands associated with one or more receivers within a predetermined distance of the transmitter. In addition, the processing circuitry can determine the number of selected spectral masks to improve based on an overall processing capacity of the processors 102.

At step S408, the processing circuitry of the SDR 200 assigns the transmit signals to one or more frequency channels within a transmit signal spectrum. In some implementations, the noise shaping schemes applied to the transmit signals allow spacing between transmit frequency channels to be reduced because the noise shaping reduced an amount of inter-channel interference. The assignment of the transmit signals to the frequency channels can be adaptively determined based on a predetermined protocol. For example, the processing circuitry can assign the transmit signals to frequency bands based on operating parameters of a network for a particular wireless communications standard, such as IEEE 802.11, $3^{rd}$ Generation Partnership Project (3GPP) Long Term Evolution (LTE), LTE-Advanced (LTE-A), and the like. In addition, the frequency channel assignments can be made based on an observation of a local spectrum with an associated receiver. The processing circuitry can also determine the frequency channel spacing and assignments based on a combination of the operating parameters for the network and the local spectrum analysis. In some implementations, step S408 may be performed prior to step S406.

In some implementations, the noise shaping process 400 can be also be applied to real simultaneous dual band (RSDB) signals where two transmit signals at different frequencies can be noise shaped and modulated simultaneously via one DAC, which reduces costs of the RF front end 216 while maintaining a performance level that corresponds to the performance of conventional RSDB applications.

Figure 5:
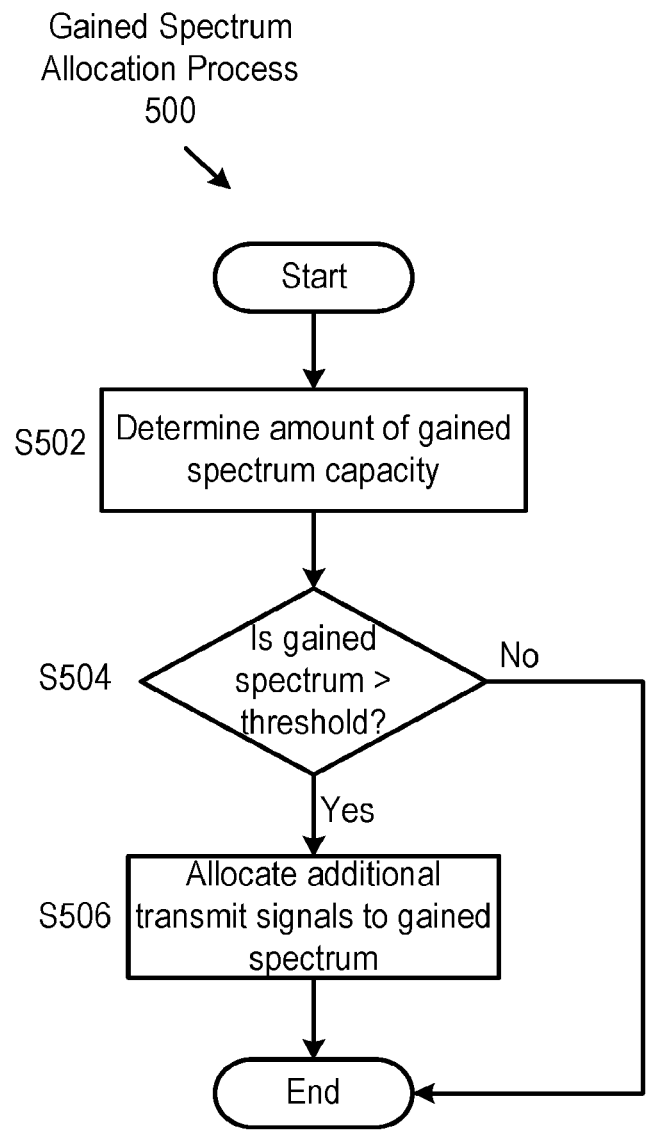
FIG. 5 is an exemplary flowchart of a gained spectrum allocation process, according to certain embodiments.

FIG. 5 is an exemplary flowchart of a gained spectrum allocation process 500, according to certain embodiments. When the noise shaping parameters are applied to the transmit signals, additional signal spectrum may be unused, which may allow additional transmit signals to be modulated onto additional frequency channels of the transmit spectrum. Modulating additional transmit signals onto the additional frequency channels can increase efficiency of the transmitter of the SDR 200 without increasing hardware and bandwidth costs.

At step S502, the processing circuitry determines an amount of gained signal spectrum based on the application of the noise shaping parameters at step S406 and the frequency channel assignments at step S408 of the noise shaping process 400. In some implementations, the processing circuitry of the SDR 200 calculates the amount of used frequency spectrum for the transmit signals prior to the application of the noise shaping parameters at step S406 and the frequency channel assignments at step S408 of the noise shaping process 400.

At step S504, the processing circuitry determines whether the amount of gained signal spectrum is greater than a predetermined threshold. In some implementations, the predetermined threshold corresponds to an average transmit signal bandwidth for one or more transmit protocols, an average transmit signal bandwidth of the transmit signals presently modulated onto the one or more transmit channels, and the like. If the amount of gained signal spectrum is greater than the predetermined threshold, resulting in a "yes" at step S504, then step S506 is performed. Otherwise, if the amount of gained signal spectrum is less than or equal to the predetermined threshold, resulting in a "no" at step S504, then the gained spectrum allocation process 500 is terminated.

At step S506, additional transmit signals are allocated to the gained signal spectrum. In some implementations, the processing circuitry determines a number of additional transmit signals to allocate to the gained signal spectrum dividing the amount of gained signal spectrum by an average transmit signal bandwidth. In addition, the processing circuitry of the SDR 200 can apply the noise shaping process 400 to the additional transmit signals to improve a total SNR of transmit signals within the transmission frequency spectrum.

Figure 6:
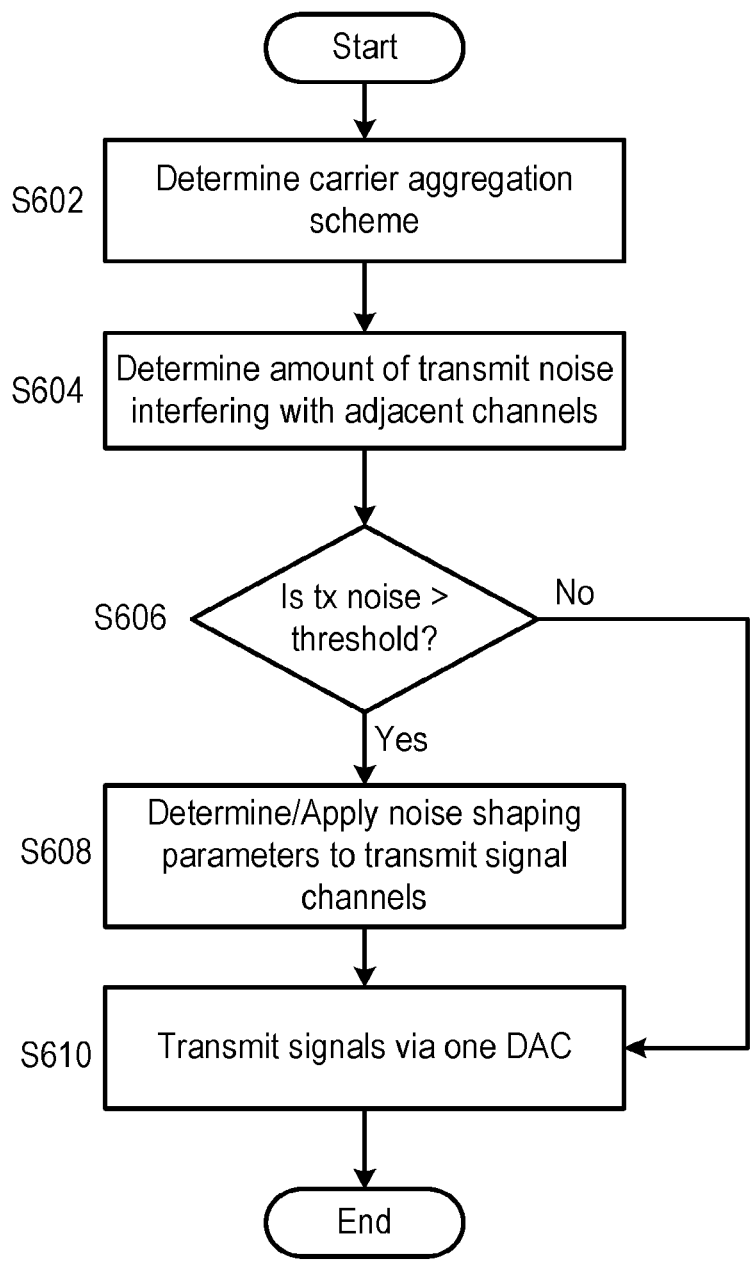
FIG. 6 is an exemplary flowchart of a carrier aggregation noise shaping process, according to certain embodiments.

FIG. 6 is an exemplary flowchart of a carrier aggregation noise shaping process 600, according to certain embodiments. Carrier aggregation provides the ability to increase data transmission rates by using multiple channels and carriers in order to increase data throughput. Using the SDR 200 to transmit carrier aggregated signals allows the carrier aggregation transmit spectrum to be adaptively shaped based on a local spectrum environment, type of receiver, size of the transmit signal, and the like.

At step S602, the processing circuitry of the SDR 200 determines a carrier aggregation scheme for one or more carrier aggregation transmit signals. For example, in some implementations, the carrier aggregation transmit signal channels can be modulated as intra-band signals where each of the transmit signals are modulated within a single frequency band. The intra-band transmit carrier aggregated transmit signals can be contiguously aligned where the transmit channels are immediately adjacent to one another or non-contiguously aligned where the transmit channels are separated by a predetermined amount of frequency spectrum. In addition, the carrier aggregation scheme can also be a an inter-band non-contiguous scheme where the transmit channels are separated into distinct frequency bands. In some implementations, the carrier aggregation scheme is based on an amount of spectrum available, number of available transceivers, and the like. For example, the non-contiguous intra-band or intra-band schemes are implemented with two or more transceivers, and the contiguous intra-band scheme can be implement with one or more transceivers.

At step S604, the processing circuitry determines an amount of transmit noise that interferes with adjacent channels for each carrier aggregated signal channel. In some implementations, the amount of transmit noise in the adjacent channels can be quantified by a SNR calculation.

At step S606, the processing determines whether the amount of interfering transmit noise associated with each of the signal channels is greater than a predetermined threshold. If the amount of interfering transmit noise is greater than the predetermined threshold, resulting in a "yes" at step S606, then step S608 is performed. Otherwise, if the amount of interfering transmit noise is less than or equal to the predetermined threshold, resulting in a "no" at step S606, then step S610 is performed.

At step S608, the processing circuitry determines and applies noise shaping parameters to the carrier aggregated signal channels to reduce the amount of interfering transmit noise with the adjacent signal channels. The noise shaping techniques and parameters applied to carrier aggregated signals correspond to the noise shaping techniques and parameters applied to other types of transmit signals as discussed previously with respect to step S406 of the noise shaping process 400.

At step S610, the carrier aggregated signals are transmitted by the RF front end circuit via a digital-to-analog converter (DAC). For SDR implementations, the transmit signals are able to be modulated and transmitted simultaneously via a single DAC circuit.

Figure 7:
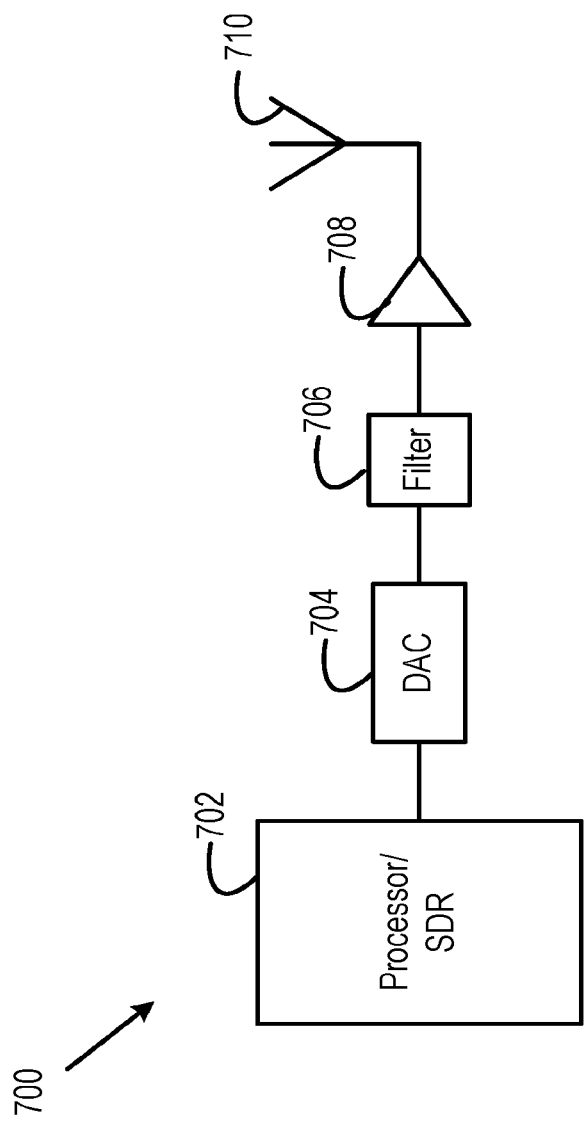
FIG. 7 is an exemplary diagram of a transmitter, according to certain embodiments.

FIG. 7 is an exemplary diagram of a transmitter 700, according to certain embodiments. The transmitter is just one implementation of at least a portion of the RF front end 216 that can be implemented in the computing device 200, and other types and structures of antennas can be used. The transmitter 700 can also be included as part of a full duplex or half-duplex transceiver that also includes circuitry associated with a receiver. The processor 702 includes processing circuitry is one implementation of the processor 202 of the computing device and can perform the noise-shaping processes described previously herein. The processor 702 can also implement the functions of the software defined components of the transmitter 700, such as computing digital samples of the transmitted signal via a digital signal processor and frequency synthesizer. The DAC 704, filter 706, power amplifier 708, and antenna 710 are included in the RF front end 216 and transform the digital signal into an analog RF waveform that can be transmitted across a signal channel.

Figure 8:
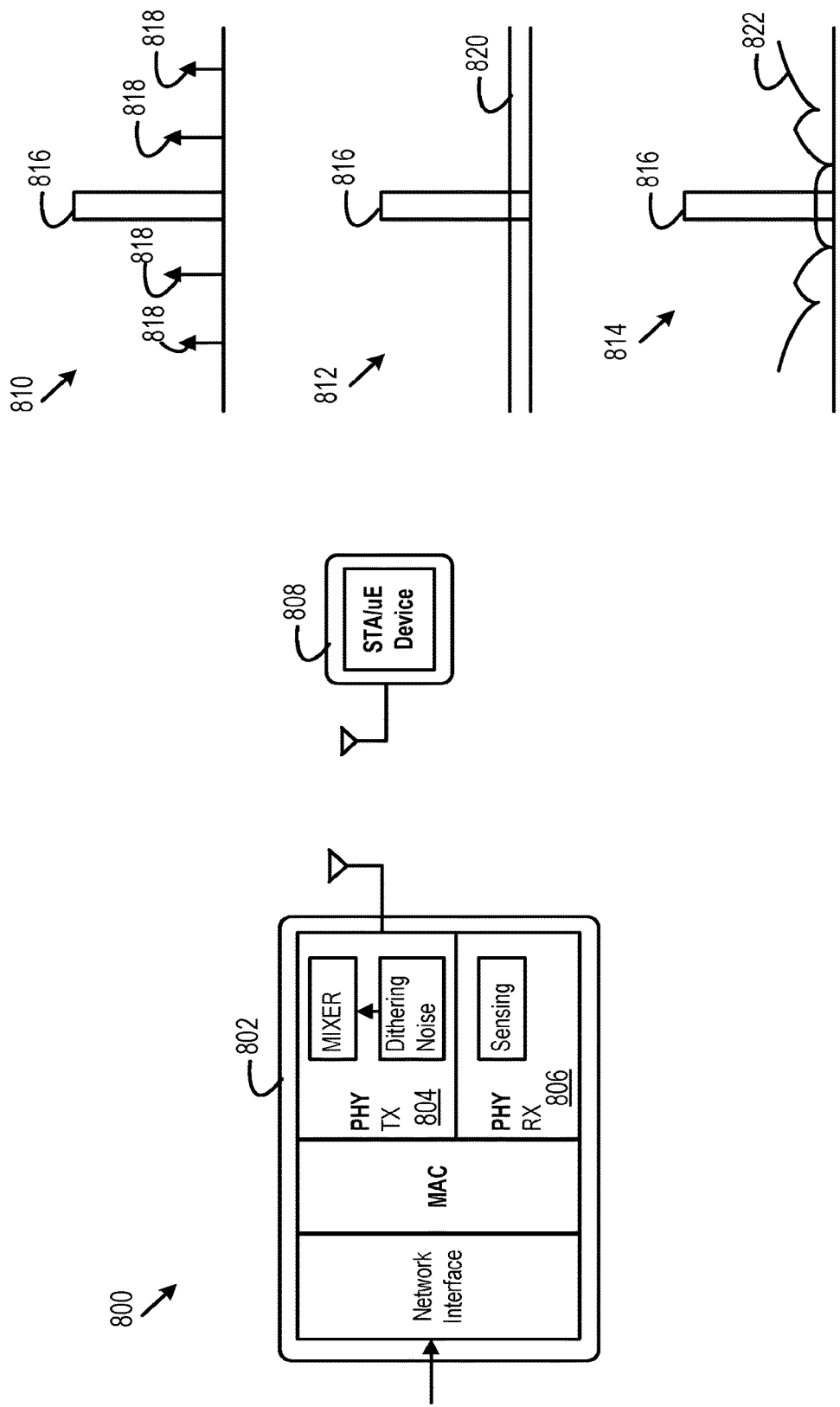
FIG. 8 is an exemplary diagram of a wireless communication system, according to certain embodiments.

FIG. 8 is an exemplary diagram of a wireless communication system 800 on which any of the processes described previously can be implemented, according to certain embodiments. The wireless communication system 800 includes an access point 802 with a digital transceiver that communicates with a station 808. The access point 802 can represent any hardware device that allow wireless devices to connect to a wired or wireless network via a communications protocol, such as any of the IEEE 802.11 standards, 3GPP Long Term Evolution (LTE), LTE-Advanced (LTE-A), and any other wireless network standard. The access points may be included as circuitry associated with a base station, switch, router, user equipment (UE), and the like.

In some implementations, the access point 802 includes one or more network layers, such as a network interface layer, media access control (MAC) layer, and physical (PHY) layer. The PHY layer of the access point 802 includes a SDR, which is an implementation of the computing device 200. Like the computing device 200, the SDR of the access points 802 can include processing circuitry to perform the methods described herein. The SDRs within the PHY layer allows the access points 802 to simultaneously sense a spectrum environment at a receiving PHY 806 while adaptively shaping transmit noise at a transmitting PHY 804.

Because the PHY layer includes the SDR, the transmitting PHY 804 includes a digital mixer that introduces undesired artifacts into a signal transmission. For example, as seen in graph 810 of a transmission spectrum bandwidth, a transmission from the access point 802 includes a transmitted signal 816 at a frequency of interest as well as multiple unwanted noise spurs 818 that are generated by the mixer. As can be seen in graph 812, the processing circuitry of the computing device 200 can perform noise dithering to convert the noise spurs 818 into a wideband noise floor 820 where a total magnitude of the noise generated by the noise spurs 818 is reduced by spreading the spurs 818 into the wideband noise floor. In addition, the processing circuitry of the computing device 200 can also perform adaptive noise shaping to introduce nulls in the dithered noise floor 820 at predetermined frequency locations based on spectrum knowledge from sensing performed by the receiver PHY 806 any other knowledge source, such as network configuration data, protocol data, handoff messages, or the like. The SDR allows the access point 802 to simultaneously sense the spectrum environment and adaptively shape the transmit noise based on the sensed spectrum environment. Graph 814 illustrates transmission spectrum bandwidth with a shaped noise floor 822 and the transmitted signal 816.

The station 808 represents any hardware device that can wirelessly communicate with the access point 802 via one or more wireless communications protocols and can include base stations or UEs such as mobile electronic devices, laptops, tablets, or cell phones. The wireless communication system 800 illustrated in FIG. 4 is just one implementation, and other implementations can include any number of access points and/or stations based on system infrastructure, capacity, or station density.

Figure 9:
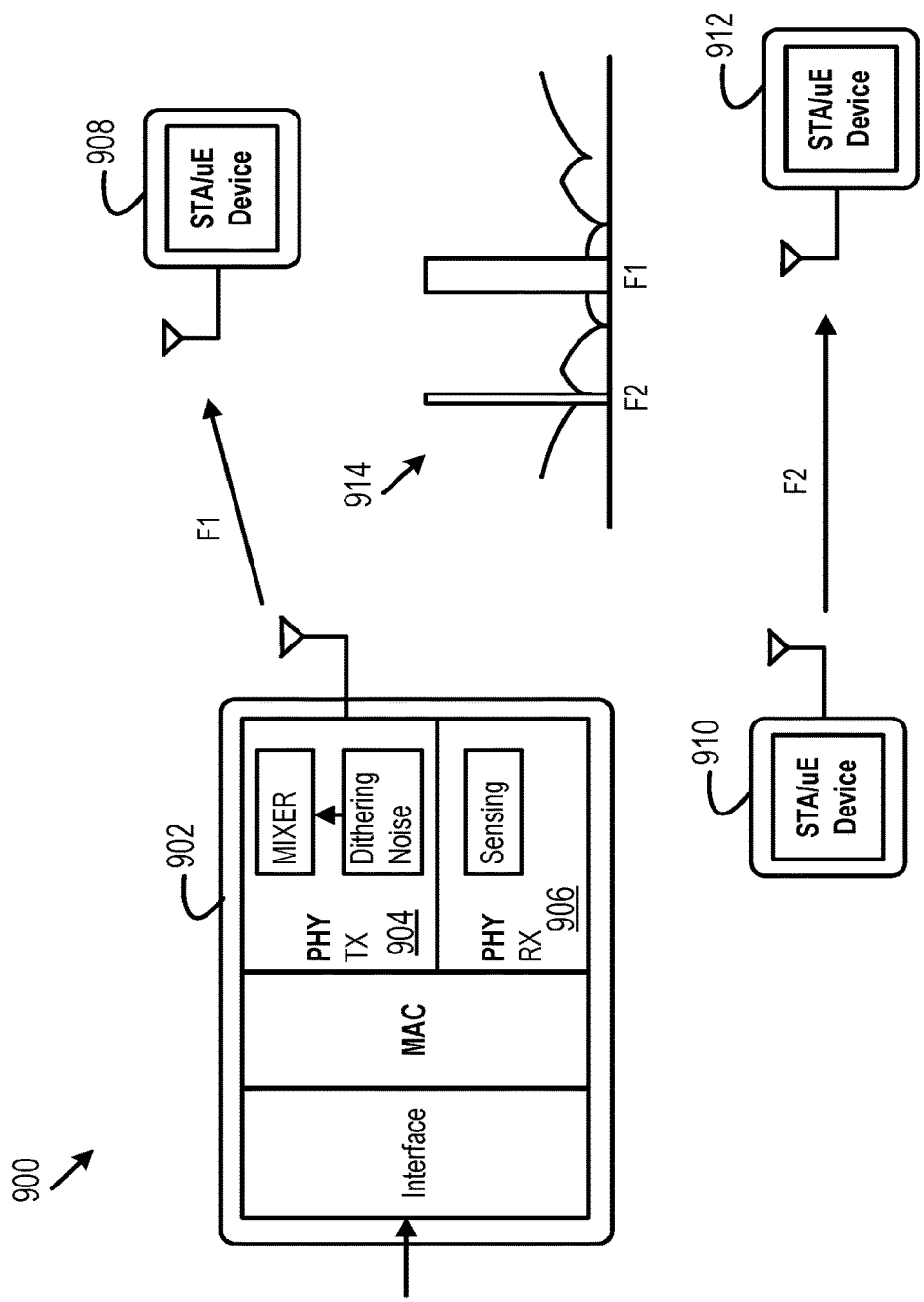
FIG. 9 is an exemplary diagram of a wireless communication system, according to certain embodiments.

FIG. 9 is an exemplary diagram of a wireless communication system 900 on which any of the processes described previously can be implemented, according to certain embodiments. The wireless communication system 900 is another implementation of the wireless communication system 800 that includes an access point 902 that communicates with station 908 on a first frequency F1 as well as a station 910 that communicates with a station 912 on a second frequency F2. For example, the PHY layer of the access point 902 includes a SDR, which is an implementation of the computing device 200. Like the computing device 200, the SDR of the access points 902 can include processing circuitry to perform the methods described herein. The SDRs within the PHY layer allows the access points 902 to simultaneously sense a spectrum environment at a receiving PHY 906 while adaptively shaping transmit noise at a transmitting PHY 904.

For example, the receiving PHY 906 can sense the broadband spectrum environment and determine that the frequency F2 is in use. The processing circuitry of the computing device 200 can also determine that the frequency F2 is in use or any other information regarding any other frequencies of interest based on one or more other knowledge sources, such as network configuration data, protocol data, handoff messages, or the like that can be received from stations or access points via a wireless network or backhaul communication network. In some implementations, the transmitting PHY 904 shapes the transmit noise to introduce nulls at predetermined frequency locations, such as at frequency F2. Graph 914 illustrates a transmission signal 916 from the access point 902 to the station 908 along with shaped noise floor 918 with a null introduced at frequency F2 to allow for transmission of signal 920 from the station 910 to the station 912 without added noise at the frequency F2. Performing adaptive noise shaping with SDR makes communication devices such as the transceiver in the access point 902 as well as the transmitter in the station 910 cheaper to implement because the shaped noise reduces complexity of processing received signals with noise present at one or more frequencies of interest.

Figure 10:
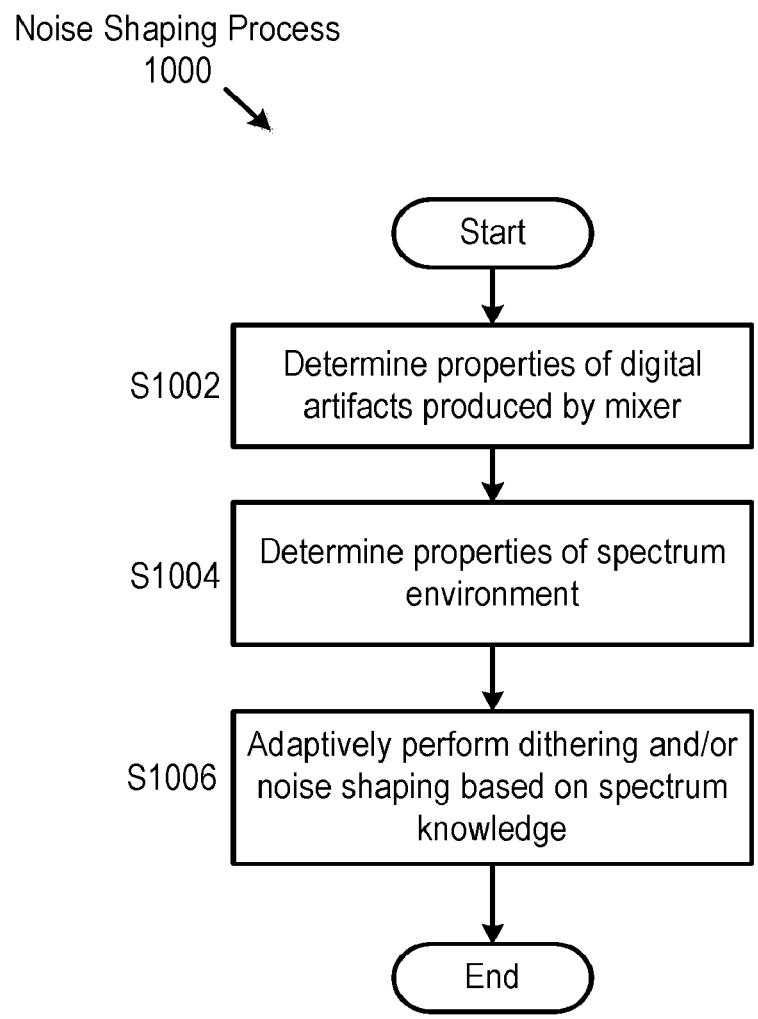
FIG. 10 is an exemplary flowchart of a noise shaping process, according to certain embodiments.

FIG. 10 is an exemplary flowchart of a noise shaping process 1000, according to certain embodiments. The noise shaping process 1000 is described with respect to the wireless communication system 800 or 900 but can also be implemented on other wireless communication system architectures that utilize SDRs in transceivers of access points and/or stations. In addition, the noise shaping process 1000 can be performed in combination with the noise shaping process 400, the gained spectrum allocation process 500, or carrier aggregation noise shaping process 600. For example, nulls produced at predetermined frequency positions during the noise shaping process 1000 allow transmission channels to be positioned more closely together in order to increase efficiency of spectrum use.

At step S1002, the processing circuitry of the computing device 200 associated with access point 902 determines properties of digital artifacts produced by a digital mixer in the transmitting PHY 904 that can include frequency and magnitude of the noise spurs. For example, as seen in graph 810 of a transmission spectrum bandwidth in FIG. 8, a transmission from the access point 802 includes a transmitted signal 816 at a frequency of interest as well as multiple unwanted noise spurs 818 that are generated by the mixer.

Referring back to FIG. 10, at step S1004, properties of the spectrum environment are determined, such as one or more frequencies that are used by one or more wireless system protocols. For example, the receiving PHY 906 can sense the broadband spectrum environment and determine that a frequency, such as the frequency F2 is in use. The processing circuitry of the computing device 200 can also determine that the frequency F2 is in use or any other information regarding any other frequencies of interest based on one or more other knowledge sources, such as network configuration data, protocol data, handoff messages, or the like that can be received from stations or access points via a wireless network or backhaul communication network.

At step S1006, the processing circuitry of the computing device 200 performs dithering and/or noise shaping based on knowledge of the spectrum environment. In some implementations, both dithering and noise shaping are applied to the transmit noise when a dithered wideband noise floor magnitude is greater than a predetermined threshold. Also, the processing circuitry may only apply dithering when the dithered wideband noise floor magnitude is less than or equal to a predetermined threshold. In other implementation, both dithering and noise shaping are applied regardless of the magnitude of the wideband noise floor.

As discussed previously, graph 812 in FIG. 8 shows that noise dithering can be performed to convert the noise spurs 818 into a wideband noise floor 820 where a total magnitude of the noise generated by the noise spurs 818 is reduced by spreading the spurs 818 into the wideband noise floor. In addition, the processing circuitry of the computing device 200 can also perform adaptive noise shaping to introduce nulls in the dithered noise floor 820 at predetermined frequency locations based on spectrum knowledge from sensing performed by the receiver PHY 806 any other knowledge source, such as network configuration data, protocol data, handoff messages, or the like. The SDR allows the access point 802 to simultaneously sense the spectrum environment and adaptively shape the transmit noise based on the sensed spectrum environment. Graph 814 illustrates transmission spectrum bandwidth with a shaped noise floor 822 and the transmitted signal 816. Also, graph 914 in FIG. 9 illustrates a transmission signal 916 from the access point 902 to the station 908 along with shaped noise floor 918 with a null introduced at frequency F2 to allow for transmission of signal 920 from the station 910 to the station 912 without added noise at the frequency F2.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
    circuitry configured to
    determine noise shaping parameters for one or more transmit signals on one or more transmit channels based on transmission protocol and spectral mask criteria,
    simultaneously determine one or more frequencies of use in a spectrum environment and adaptively shape a wideband noise floor to produce nulls at the one or more frequencies of use,
    identify frequency positions for the one or more transmit channels based on the noise shaping parameters, and
    apply the noise shaping parameters to the one or more transmit signals.

2. The device of claim 1, wherein the noise shaping parameters include at least one of a sampling rate, a noise shaping scheme, or a spectral mask.

3. The device of claim 1, wherein the circuitry is further configured to determine the noise shaping parameters based on properties of one or more receivers within a predetermined communication distance of the device.

4. The device of claim 3, wherein the circuitry is further configured to detect the one or more receivers based on a local spectrum assessment at an offline receiver.

5. The device of claim 3, wherein the circuitry is further configured to selectively apply a noise shaping scheme to at least one of the one or more transmit channels based on the properties of the one or more receivers.

6. The device of claim 1, wherein the circuitry is further configured to determine the noise shaping parameters for the one or more transmit channels based on a transmission protocol associated with each of the transmission channels.

7. The device of claim 1, wherein the circuitry is further configured to configure one or more digital-to-analog converter parameters based on the spectral mask criteria.

8. The device of claim 1, wherein the circuitry is further configured to determine the noise shaping parameters based on an amount of transmission interference with additional devices.

9. The device of claim 8, wherein the circuitry is further configured to determine the amount of transmission interference with the additional devices based on feedback signals received from the additional devices via a backhaul network.

10. The device of claim 8, wherein the circuitry is further configured to determine the amount of transmission interference with the additional devices based on properties of received signals from the additional devices.

11. The device of claim 1, wherein the circuitry is further configured to determine a sampling rate corresponding to a multiple of a Nyquist rate based on the noise shaping properties.

12. The device of claim 1, wherein the circuitry is further configured to determine an amount of gained spectrum width based on applying a noise shaping scheme to the one or more transmit channels.

13. The device of claim 12, wherein the circuitry is further configured to allocate one or more additional transmit channels based on the amount of gained spectrum.

14. The device of claim 1, wherein the circuitry is further configured to generate a plurality of carrier aggregation transmissions simultaneously via one digital-to-analog converter.

15. The device of claim 1, wherein the circuitry is further configured to apply dithering to noise spurs generated by a mixer in a transmitting PHY layer to generate a wideband noise floor.

16. The device of claim 1, wherein the circuitry is further configured to sense the spectrum environment via a receiving PHY layer to determine the one or more frequencies of use.

17. The device of claim 1, wherein the circuitry is further configured to determine the one or more frequencies of use based on at least one of network configuration data, protocol data, or handoff messages received from one or more additional devices via a network.

18. A method comprising:
   determining noise shaping parameters for one or more transmit signals on one or more transmit channels based on transmission protocol and spectral mask criteria;
   simultaneously determining one or more frequencies of use in a spectrum environment and adaptively shaping a wideband noise floor to produce nulls at the one or more frequencies of use;
   identifying frequency positions for the one or more transmit channels based on the noise shaping parameters, and
   applying the noise shaping parameters to the one or more transmit signals.

19. A device comprising:
   circuitry configured to
      determine sampling rates for one or more transmit signals based on predetermined signal and noise specifications for the one or more transmit signals,
      modulate the one or more transmit signals simultaneously within a predefined frequency spectrum, and
      adaptively modify at least one of the sampling rates or frequency bands of the one or more transmit signals based on properties of a transmit channel or a receiver.

* * * * *